O. J. JOHNSON.
CAN BODY SOLDERING MACHINE.
APPLICATION FILED AUG. 12, 1915.
1,170,161.
Patented Feb. 1, 1916.
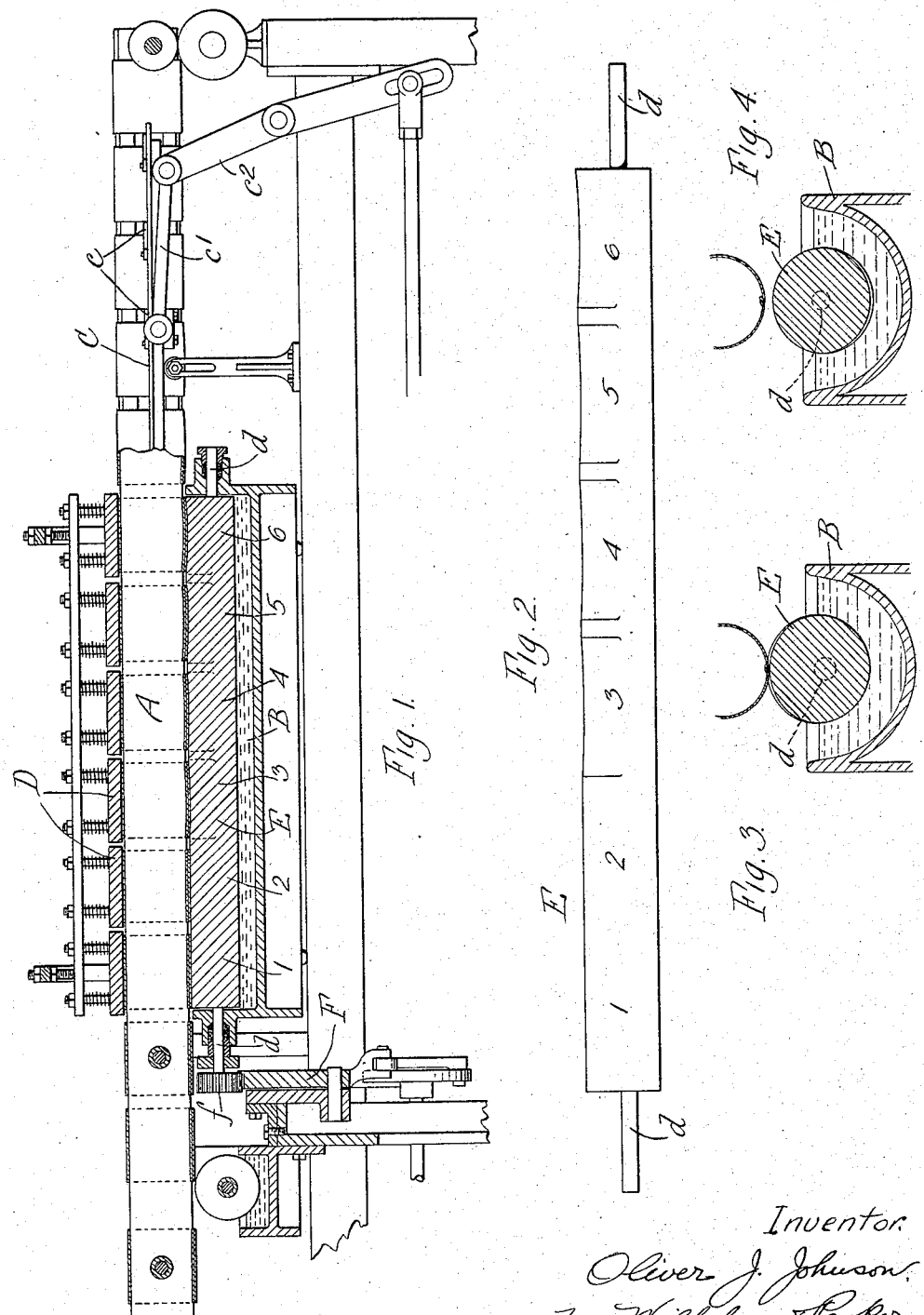
Inventor.
Oliver J. Johnson.
By Wilhelm & Parker.
Attorneys.

UNITED STATES PATENT OFFICE.

OLIVER J. JOHNSON, OF WHEELING, WEST VIRGINIA.

CAN-BODY-SOLDERING MACHINE.

1,170,161. Specification of Letters Patent. Patented Feb. 1, 1916.

Application filed August 12, 1915. Serial No. 45,123.

*To all whom it may concern:*

Be it known that I, OLIVER J. JOHNSON, a citizen of the United States, residing at Wheeling, in the county of Ohio and State of West Virginia, have invented a new and useful Improvement in Can-Body-Soldering Machines, of which the following is a specification.

This invention relates to machines for soldering the longitudinal or side seams of can bodies, and particularly to improvements in side seam soldering machines of the sort disclosed in Patent No. 776,473, granted to me November 29, 1904, in which the can bodies are moved intermittently endwise along a horn or support with their side seams lowermost, and the solder is applied to the same by a soldering roll which is arranged lengthwise beneath the can body support in a bath of molten solder and oscillates or turns in a direction crosswise of the seams to apply the solder thereto. It has been found in soldering can body side seams in this manner that the heat warps the can bodies so that the intermediate portions of the seams bulge outwardly, with the result that the intermediate portions of the seams contact with the roll and are soldered, while the end portions of the seams do not contact with the roll and are not properly soldered unless usually heavy pressure is applied.

The object of this invention is to produce an efficient soldering mechanism or device which will thoroughly and uniformly solder the side seams from end to end thereof, notwithstanding this warping or bulging of the seams. This is accomplished by providing the solder applying roll with surface portions shaped so as to conform to the warped or bulged shape of the can bodies in such a way that the roll will contact with and apply the solder to the seams substantially uniformly from end to end thereof.

In the accompanying drawings: Figure 1 is a fragmentary longitudinal sectional elevation of a can side-seam soldering machine embodying the invention. Fig. 2 is a side elevation, on an enlarged scale, of the soldering roll. Figs. 3 and 4 are fragmentary transverse sections, on a still larger scale, showing different positions of the soldering roll.

A represents the horn or support of a side-seam soldering machine by which the can bodies are supported and along which they are moved intermittently by suitable feed mechanism and B represents a solder box or receptacle which is arranged beneath the can body support and contains a bath of molten solder which is maintained in a molten condition by the usual or any suitable heating means.

This invention is concerned only with the formation of the soldering roll, and the can body support, mechanism for moving the can bodies intermittently along the same, pressure devices and other parts of the machine, may be of the construction disclosed in the before mentioned patent or of any other suitable construction. In the machine shown, as in the case of the machine of said patent, the can bodies are moved intermittently along the can body support over the soldering device by horizontal reciprocating feed bars C arranged at opposite sides of the support and provided with feed dogs $c$ adapted to engage with the can bodies. A portion of one of these feed bars is shown. $c'$ is a link connecting this feed bar to an operating lever $c^2$ therefor. Each time the feed bars move forwardly the dogs engage the can bodies and move them forwardly one step in a well known manner. D indicates spring-pressed pressure blocks or devices similar to those shown in said patent arranged over the can body support and adapted to bear against the can bodies for pressing them down against the soldering roll.

E represents the soldering roll or device which is arranged lengthwise under the can body support and is partially submerged in the solder bath. This roll can be journaled in any suitable manner, as by means of journals $d$ at its ends seated in suitable bearings at the ends of the solder box, and it can be either turned in one direction or oscillated by any suitable means. As shown, it is oscillated by an oscillating gear segment F meshing with a pinion $f$ on the journal at one end of the soldering roll, as in the case of the machine shown in said patent. The soldering roll extends beneath and is adapted to apply solder to several of the can bodies, say six of them, simultaneously, and since all of the can bodies are advanced at each reciprocation of the feed bars a distance slightly greater than the length of a can body, the soldering roll operates upon each can body six times before it passes beyond the range of the roll.

That portion of the soldering roll at the end of the soldering mechanism at which the can bodies enter is preferably cylindrical, as the can bodies do not warp appreciably until they have passed far enough over the solder bath to become well heated, and a soldering roll with a straight surface at this portion will contact properly with the overlying can bodies throughout the length thereof. The remainder of the soldering roll is provided with concaved surface portions, each adapted to conform to the warped or bulged shape of the lower portion of the can body disposed above the same and contact therewith from end to end of the seam. The roll shown is of a length to operate on six can bodies and it preferably has two cylindrical portions 1 and 2, or a continuous cylindrical portion long enough to solder two can bodies, and four concaved portions 3, 4, 5 and 6, but the number of cylindrical and concaved portions can be varied, as may be desired. The warping or bulging of the bodies becomes more pronounced as the bodies are moved along over the soldering device and the successive concave portions 3, 4, 5 and 6, are therefore preferably concaved to a correspondingly greater extent, each concave portion being of sufficiently greater concavity than the preceding portion to properly contact with the seam from end to end thereof. Each can body first contacts with the cylindrical portion of the soldering roll and afterward with the several concave portions thereof in succession, and as each concave portion corresponds with the convexity of the can body at the time when the can body is above the same, the seam will be thoroughly and uniformly soldered by the time the can body leaves the last soldering portion of the soldering roll.

In order to prevent the can bodies from scraping along the surface of the roll and scooping up the solder, thereby wasting the solder and getting it on the inside of the can, the soldering roll is so shaped and its movements are so timed relative to the movements of the can body feed mechanism that the can bodies will be moved forwardly only while the seams are out of contact with the roll, and the soldering roll will contact with the can bodies to apply the solder thereto only while the bodies remain at rest between their intermittent movements. For this purpose the roll can be eccentrically journaled, as shown, or it could be of segmental circular shape in cross section or be provided with portions of different radius at opposite sides thereof, as shown in said patent. With any of these constructions the roll will be moved into contact with the seams to apply the solder thereto, as indicated in Fig. 3, and then again out of contact with the seams, as indicated in Fig. 4, either by rotating or oscillating the roll. The can bodies are fed forwardly during the times when they are out of contact with the soldering roll.

I claim as my invention:

1. Means for soldering the side seams of can bodies comprising a soldering device having a surface portion which is curved lengthwise of the can body to conform to the warped shape of the seam when the latter is heated.

2. Means for soldering the side seams of can bodies comprising a soldering device having surface portions with which the can body is adapted to contact in succession, one at least of which surface portions is curved lengthwise of the can body to conform to the warped shape of the seam when the latter is heated.

3. Means for soldering the side seams of can bodies comprising a soldering device having a succession of concave surface portions with which the can body is adapted to contact in succession and which are curved lengthwise of the can body to conform to the warped shape of the seam when the latter is heated.

4. Means for soldering the side seams of can bodies comprising a soldering device having a succession of concave surface portions with which the can body is adapted to contact in succession and which are curved lengthwise of the can body to conform to the warped shape of the seam when the latter is heated, said surface portions being of successively increased concavity.

5. Means for soldering the side seams of can bodies comprising a soldering device having a surface portion which is curved lengthwise of the can body to conform to the warped shape of the seam when the latter is heated, and means for moving said surface portion transversely across the seam to apply solder thereto.

6. Means for soldering the side seams of can bodies comprising a soldering roll partially submerged in molten solder and having a surface portion which is curved lengthwise of the roll to conform to the warped shape of the seam when the latter is heated, and means for turning the roll to move said surface portion transversely across the seam to apply solder thereto.

7. Means for soldering the side seams of can bodies comprising a bath of molten solder over which the can body moves endwise, a soldering roll arranged in said solder lengthwise under the path of movement of the can body and having surface portions which are curved lengthwise of the roll to conform to the warped shape of the seam when the latter is heated, and means for causing contact between the seam and said surface portions in succession and for moving said surface portions transversely across the seam.

8. Means for soldering the side seams of can bodies comprising a bath of molten solder over which the can body moves endwise, a soldering roll arranged in said solder to turn about an axis extending lengthwise under the path of movement of the can body and having a plurality of surface portions which are curved lengthwise of the roll to conform to the warped shape of the seam when the latter is heated, and means for turning said roll into and out of contact with the seam.

9. Means for soldering the side seams of can bodies comprising a bath of molten solder over which the can body is supported, a soldering roll arranged in said solder to turn about an axis extending lengthwise relative to the can body and having a surface portion which is moved into and out of contact with the can seam by turning the roll, said surface portion being concaved lengthwise of the roll to conform to the warped shape of the seam when the latter is heated.

Witness my hand this 30th day of June, 1915.

OLIVER J. JOHNSON.

Witnesses:
CHAS. HARPFER,
O. L. TEAGARDEN.